(12) United States Patent
Kim

(10) Patent No.: US 8,355,225 B2
(45) Date of Patent: Jan. 15, 2013

(54) APPARATUS AND METHOD FOR PROTECTING OVERVOLTAGE OF HIGH VOLTAGE INVERTER

(75) Inventor: Hyo jin Kim, Seoul (KR)

(73) Assignee: LS Industrial Systems Co., Ltd., Anyang-Si (KR)

( * ) Notice: Subject to any disclaimer, the term of this patent is extended or adjusted under 35 U.S.C. 154(b) by 162 days.

(21) Appl. No.: 12/873,220

(22) Filed: Aug. 31, 2010

(65) Prior Publication Data

US 2011/0157751 A1 Jun. 30, 2011

(30) Foreign Application Priority Data

Dec. 30, 2009 (KR) .................. 10-2009-0134688

(51) Int. Cl.
*H02H 9/04* (2006.01)
(52) U.S. Cl. ............................................ 361/18
(58) Field of Classification Search .............. 361/18
See application file for complete search history.

(56) References Cited

U.S. PATENT DOCUMENTS

| | | | | |
|---|---|---|---|---|
| 5,917,369 | A | * | 6/1999 | Nguyen ........................ 330/10 |
| 8,248,128 | B2 | * | 8/2012 | Nakamura et al. ............ 327/172 |
| 2004/0145924 | A1 | * | 7/2004 | Jang et al. ..................... 363/20 |
| 2004/0150265 | A1 | * | 8/2004 | Gotzenberger ................ 307/11 |
| 2007/0126373 | A1 | * | 6/2007 | Yu et al. ........................ 315/291 |
| 2008/0048732 | A1 | * | 2/2008 | Oki ................................ 327/77 |

FOREIGN PATENT DOCUMENTS

| | | | |
|---|---|---|---|
| JP | 361050239 A | * | 8/1984 |
| JP | 2007295649 | | 11/2007 |

* cited by examiner

*Primary Examiner* — Rexford Barnie
*Assistant Examiner* — Angela Brooks
(74) *Attorney, Agent, or Firm* — Lee, Hong, Degerman, Kang & Waimey

(57) ABSTRACT

Disclosed herein is an overvoltage protection apparatus and method of a high voltage inverter adapted to protect a load without any adverse effect from an overvoltage aroused by voltage fluctuation attributable to an impedance difference among an inverter, a load and a cable connected between the inverter and the load, wherein the apparatus and method converts a voltage command signal given as a digital signal into an analog reference signal by a main control unit, compares the analog reference voltage with a sawtooth wave having a predetermined voltage level and frequency in order to generate a PWM (Pulse Width Modulation) signal, determines the pulse width of the PWM signal, and converts the pulse width of the PWM signal to have a predetermined time interval in a case the pulse width of the PWM signal is less than a predetermined time interval.

5 Claims, 4 Drawing Sheets

APPARATUS AND METHOD FOR PROTECTING OVERVOLTAGE OF HIGH VOLTAGE INVERTER

CROSS-REFERENCE TO RELATED APPLICATIONS

Pursuant to 35 U.S.C. §119(a), this application claims the benefit of earlier filing date and right of priority to Korean Application No. 10-2009-0134688, filed on Dec. 30, 2009, the contents of which are hereby incorporated by reference herein in their entirety.

BACKGROUND OF THE INVENTION

1. Field of the Invention

The present invention relates to an overvoltage protection apparatus and method of a high voltage inverter. More especially, the present invention relates to an overvoltage protection apparatus and method of a high voltage inverter adapted to protect a load without any adverse effect from an overvoltage aroused by voltage fluctuation attributable to an impedance difference among an inverter, a load and a cable connected between the inverter and the load.

2. Description of the Related Art

In general, inverters are much used in the case of accurately driving a load such as 3-phase electric motors. In order to drive a load using the inverter, a cable is connected to supply a voltage outputted from the inverter between the inverter and the load.

The impedances of the inverter, the load and the cable differ from each other. Hence, a voltage reflection phenomenon takes place where a voltage produced at the inverter and supplied through the cable to the electric motor reflects at a discontinuity point of the impedance, resultantly creating voltage fluctuations.

Cancellation of the produced voltage fluctuations does not have an impact on the inverter normally driving a load. However, overlap of the produced voltage fluctuations causes an over-voltage more than a pressure resistant to the load insulation applies to a load to thereby produce insulation breakage and bearing damage, etc. due to the stress accumulation in a load.

A high voltage inverter in a cascade H-bridge fashion is low in the amount of a voltage change per unit time compared to a general inverter. Therefore, in a high voltage of cascade H-bridge mode, there occurs less insulation breakage of a load and a bearing damage and also less malfunction of peripheral devices, etc. due to an over-voltage compared to the general inverter even if the length of a cable connecting it to the load is longer.

However, the use of a high voltage inverter of cascade H-bridge mode fails to completely remove voltage fluctuations, and there still occurs voltage fluctuations causing damage to a load.

The impact due to voltage fluctuations, occurs more greatly in a case of fastly switching some switching devices configuring a high voltage inverter of cascade H-bridge mode or with a shallow width of a PWM (Pulse Width Modulation) signal to switch the switching devices.

SUMMARY OF THE INVENTION

An apparatus and method for protecting an overvoltage of a high voltage inverter of the present invention converts a voltage command signal given as a digital signal into an analog reference voltage by a main control unit.

And, the proposed disclosure generates a PWM (Pulse Width Modulation) signal by comparing a sawtooth wave having a predetermined voltage level and frequency with the converted analog reference voltage, and determines the pulse width of the generated PWM signal.

In a case a pulse width of the PWM signal is more than a predetermined time interval, the proposed disclosure outputs the PWM signal as it is without adjusting the pulse width of the PWM signal and thus switches the switching devices.

And, in a case the pulse width of the PWM signal is lower than a predetermined time interval, the proposed disclosure adjusts the pulse width of the PWM signal to have a predetermined time interval and accordingly outputs it and switches switching devices.

Therefore, an overvoltage protection apparatus of a high voltage inverter according to one embodiment of the present invention comprises a sawtooth wave generation unit generating a sawtooth wave having a predetermined frequency and a voltage level, an analog reference voltage generation unit converting a voltage command signal inputted from a main control unit to an analog reference voltage, a comparison unit comparing the voltage levels of the sawtooth wave and the analog reference voltage to generate a PWM (Pulse Width Modulation) signal, a pulse width determination unit determining the pulse width of the PWM signal; and a PWM signal output unit adjusting the pulse width of the PWM signal according to the determination of the pulse width determination unit.

According to an aspect of one embodiment of the present invention, the PWM signal output unit outputs the PWM signal as it is, in a case the pulse width of the PWM signal is more than a predetermined time interval, and the PWM signal output unit adjusts the pulse width of the PWM signal to have a predetermined time interval and outputs the adjusted PWM signal, in a case the pulse width of the PWM signal is less than the predetermined time interval.

And, an overvoltage protection method of a high voltage inverter according to one embodiment of the present invention comprises converting a voltage command signal provided as a digital signal by a main control unit to an analog reference signal, generating a PWM (Pulse Width Modulation) signal by comparing the analog reference voltage with a sawtooth wave having a predetermined voltage level and frequency, determining the pulse width of the PWM signal and converting the pulse width of the PWM signal to have a predetermined time interval, in a case the pulse width of the PWM signal is less than a predetermined time interval.

DETAILED DESCRIPTION OF THE INVENTION

The following detailed description is by method of example, and it merely shows an embodiment of the invention. In addition, the principle and concept of the present invention will be provided for the most useful and easy description.

Thus, detailed structures unnecessarily required in the basic understanding of the present invention have not been provided, and several kinds of forms possibly practiced by one skilled in the art from the substance of the invention will be exemplified through the drawings.

Figure 1:
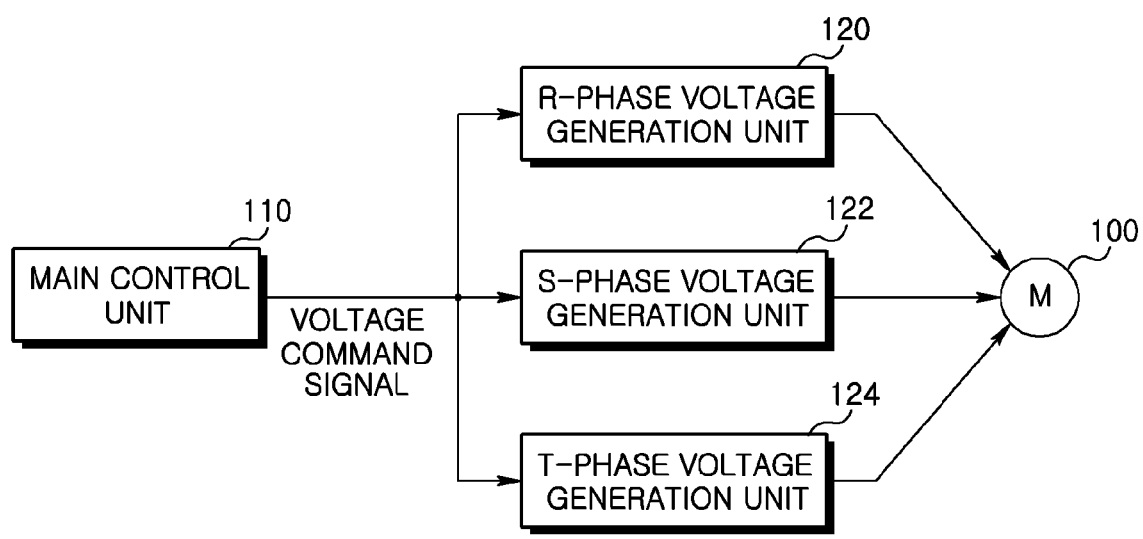
FIG. 1 is a diagram showing the construction of a high voltage inverter.

FIG. 1 is diagram showing the construction of a high voltage inverter. Herein, a symbol 100 indicates a load. For example, the load is a 3-phase alternating electric motor driven by a 3-phase alternating voltage.

A symbol 110 indicates a main control unit. The main control unit 110 determines the drive status of the load 100, and generates a voltage command signal including a reference voltage for generating a PWM signal according to the determined drive status.

Symbols 120, 122 and 124 indicate a plurality of voltage generation units. A plurality of voltage generation units 120, 122 and 124 are for example, voltage generation units configured to generate a R-phase voltage, an S-phase voltage and a T-phase voltage, respectively, generating a R-phase voltage, an S-phase voltage and a T-phase voltage according to a voltage command signal generated by the main control unit 110 and outputting them to the load 100.

In a high voltage inverter featuring such a configuration, a main control unit 110 determines the drive status of an electric motor, that is a load 100, and generates a voltage command signal including a reference voltage according to the determined drive status and a drive instruction instructed by a user (not shown in the figure).

A voltage command signal generated by the main control unit 110 is inputted to a plurality of voltage generation units 120, 122 and 124, and the plurality of voltage generation units 120, 122 and 124 generate the 3-phase voltage of each of a R-phase, an S-phase and a T-phase according to the voltage command signal.

The generated R-phase, S-phase and T-phase of a 3-phase voltage are applied to an electric motor, that is a load 100, for driving the load 100.

Figure 2:
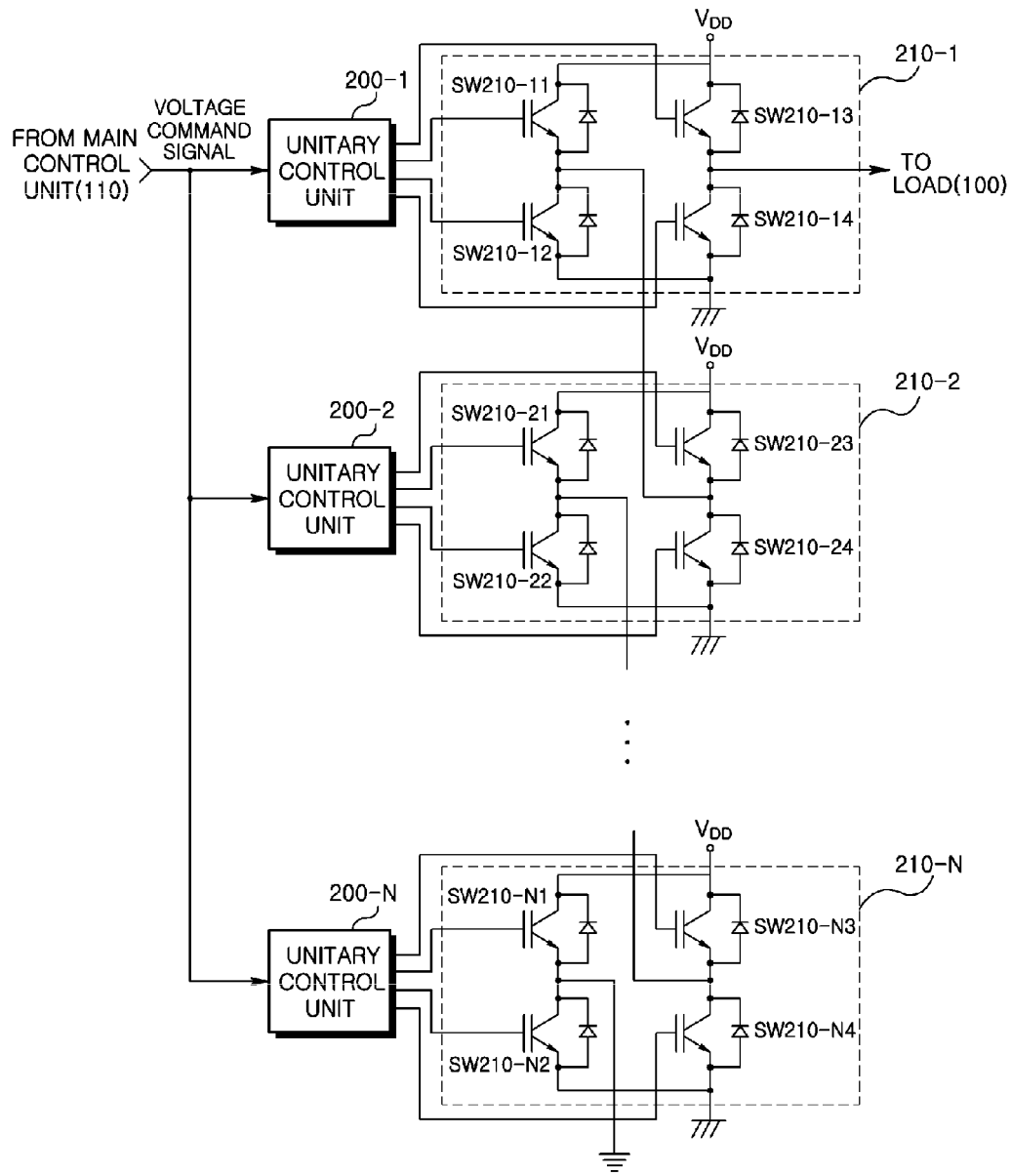
FIG. 2 is a diagram showing the construction of each of a plurality of voltage generators in a high voltage inverter.

FIG. 2 is a diagram showing the construction of each of a plurality of voltage generation units 120, 122 and 124. Here, symbols 200-1, 200-2, . . . , 200-N indicate a plurality of unitary control units. Each of the plurality of unitary control units 200-1, 200-2, . . . , 200-N generate a plurality of switching signals according to a voltage command signal outputted by the main control unit 100.

Symbols 210-1, 210-2, . . . , 210-N indicate a plurality of switching units. The plurality of switching units 210-1, 210-2, . . . , 200-N are serially connected between the load and a ground, and switches the voltage of a power terminal VDD according to the respective switching signals of the plurality of unitary control units 210-1, 210-2, . . . , 210-N for outputting a 3-phase voltage to the load 100.

Switching devices (SW210-11, SW210-12) (SW210-13, SW210-14), (SW210-21, SW210-22) (SW210-23, SW210-24), . . . , (SW210-N1, SW210-N2) (SW210-N3, SW210-N4) positioned in each of the plurality of switching units 210-1, 210-2, . . . , 210-N are connected in serial between a power terminal VDD and a ground, respectively.

The base of the respective switching devices SW210-N1~SW210-14, SW210-21~SW210-24, . . . , SW210-N1~SW210-N4 is configured to accept each of a plurality of switching signals outputted by each of the plurality of unitary control units 200-1, 200-2, . . . , 200-N.

A joining point of an emitter of the switching device SW210-13 and a collector of the switching device SW210-14 is connected to the load 100. And a joining point an emitter of the switching device SW210-11, SW210-21, . . . and a collector of the switching device SW210-12, SW210-22, . . . is connected to a joining point of an emitter of the switching device SW210-23, SW210-33 . . . and a collector of the switching device SW210-24, SW210-34 . . . , respectively. Also, a joining point of an emitter of the switching device SW210-N2 and a emitter of the switching device SW210-N4 is connected to a ground.

In a state of the application of an operating voltage VDD to each of a plurality of voltage generation units 120, 122 and 124 characterized by such a configuration, each of the plurality of unitary control units 200-1, 200-2, . . . , 200-N generates a PWM (Pulse Width Modulation) signal as a given switching signal according to a voltage command signal outputted by the main control unit 110.

A PWM signal generated as a switching signal by each of the plurality of unitary control units 200-1, 200-2, . . . , 200-N is applied to the base of each switching device SW210-11~SW210-14, SW210-21~SW210-24, . . . , SW210-N1~SW210-N4 of the plurality of switching units 200-1, 200-2, . . . , 200-N.

Then, the plurality of switching devices SW210-11~SW210-14, SW210-21~SW210-24, . . . , SW210-N1~SW210-N4 positioned in each of the plurality of switching units 200-1, 200-2, . . . , 200-N turns on and turns off selectively according to the PWM signal and switches an operating voltage of a power terminal VDD. And, a voltage outputted by each of the plurality of switching units (210-1) (210-2) . . . (210-N) overlaps each other, being outputted to the load 100.

Figure 3:
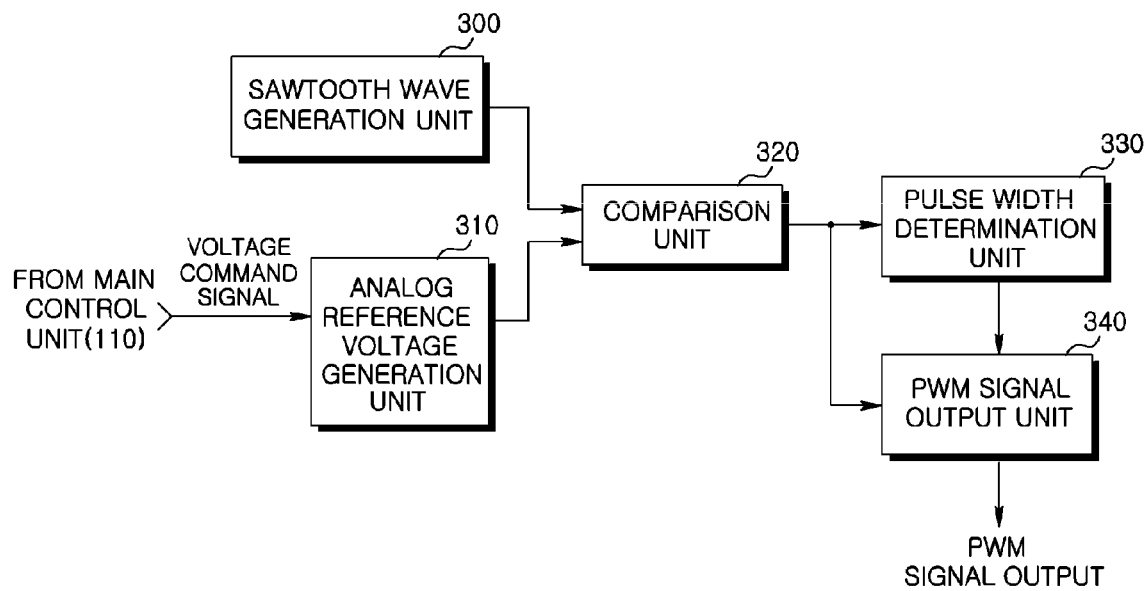
FIG. 3 is a diagram showing the construction of a preferred embodiment of a unitary control unit according to an overvoltage protection apparatus of the present invention.

FIG. 3 is a diagram showing the construction of a preferred embodiment of a unitary control unit according to an overvoltage protection apparatus of the present invention. Herein, a symbol 300 is a sawtooth wave generation unit. The sawtooth wave generation unit 300 generates a sawtooth wave having a given frequency.

A symbol 310 is an analog reference voltage generation unit. The analog reference voltage generation unit 310 converts a voltage command signal inputted from the main control unit 110 into an analog reference voltage.

A symbol 320 is a comparison unit. The comparison unit 320 compares the voltage levels of a sawtooth wave generated by the sawtooth generation unit 300 and an analog reference voltage converted from the analog reference voltage generation unit 310 in order to generate a PWM signal.

A symbol 330 is a pulse width determination unit. The pulse width determination unit 330 determines if the pulse width of a PWM signal output from the comparison unit 320 is lower than a predetermined time interval, and thus generates a determination signal.

A symbol 340 is a PWM signal output unit. The PWM signal output unit 340 outputs a PWM signal generated from the comparison unit 320 as a switching signal in a case the pulse width determined by the pulse width determination unit 330 is more than a predetermined time interval. However, the PWM signal output unit 340 adjusts the width of a PWM signal generated from the comparison unit 320 to be the predetermined time interval and outputs the adjusted PWM signal in a case the pulse width determined by the pulse width determination unit 330 is less than a predetermined time interval.

According to the present invention featuring such a configuration, a sawtooth wave generation unit 300 generates a sawtooth wave having a predetermined given frequency, and the generated sawtooth wave is inputted to the comparison unit 320.

And a voltage command signal outputted by the main control unit 110 is inputted to the analog reference voltage generation unit 310. Then, the analog reference voltage generation unit 310 converts the voltage command signal into an analog reference voltage.

That is, the main control unit 110 provides a voltage command signal in a voltage level varied to supply a 3-phase voltage for the load 100 and in a digital signal to a plurality of unitary control units 200-1, 200-2, . . . , 200-N. And the analog reference voltage generation unit 310 positioned in each of the plurality of unitary control units 200-1, 200-2, . . . , 200-N converts a voltage command signal given in a digital signal inputted by the main control unit 110 into an analog reference voltage.

The analog reference voltage converted by the analog reference voltage generation unit 310 is inputted to the comparison unit 320.

Then, the comparison unit 320 compares the voltage levels of a sawtooth wave generated by the sawtooth generation unit 300 and an analog reference voltage converted by the analog reference voltage generation unit 310, and generates a PWM signal having a given pulse width according to the comparison result.

For example, the comparison unit 320 compares voltage levels between the sawtooth wave and the analog reference voltage and thus generates a PWM signal having a pulse width corresponding to a time interval in which the voltage level of the sawtooth wave is higher than that of the analog reference voltage.

A PWM signal generated by the comparison unit 320 is inputted to a pulse width determination unit 330 and a PWM signal output unit 340, respectively.

The pulse width determination unit 330 determines if the pulse width of a PWM signal generated by the comparison unit 320 is more than a predetermined time interval or is less than that, and outputs the determination signal to the PWM signal output unit 340.

Then, according to a determination signal of the pulse width determination unit 330, the PWM signal output unit 340 outputs a PWM signal generated by the comparison unit 320 as it is without changing the pulse width thereof or adjusts and outputs the pulse width of a PWM signal generated by the comparison unit 320 into a predetermined time interval.

For example, supposing that a predetermined time interval is 1 ms, the pulse width determination unit 330 determines if the pulse width of a PWM signal generated by the comparison unit 320 is more than 1 ms or less than 1 ms and generates a determination signal.

And, in a case the pulse width determination unit 330 determines that the pulse width of a PWM signal is more than 1 ms, the PWM signal output unit 340 outputs a PWM signal generated by the comparison unit 320 as it is, with no change in the pulse width.

In a case the pulse width determination unit 330 determines that a PWM signal pulse width is less than 1 ms, the PWM signal output unit 340 changes the pulse width of the PWM signal generated by the comparison unit 320 into 1 ms to be outputted.

As such, according to the present invention, a PWM signal output from the PWM signal output unit 340, having a minimum degree width, is applied to the respective base of switching devices SW210-11~SW210-14, SW210-21~SW210-24, . . . , SW210-N1~SW210-N4 of each of the plurality of switching units 200-1, 200-2, . . . , 200-N for switching operation.

Figure 4:
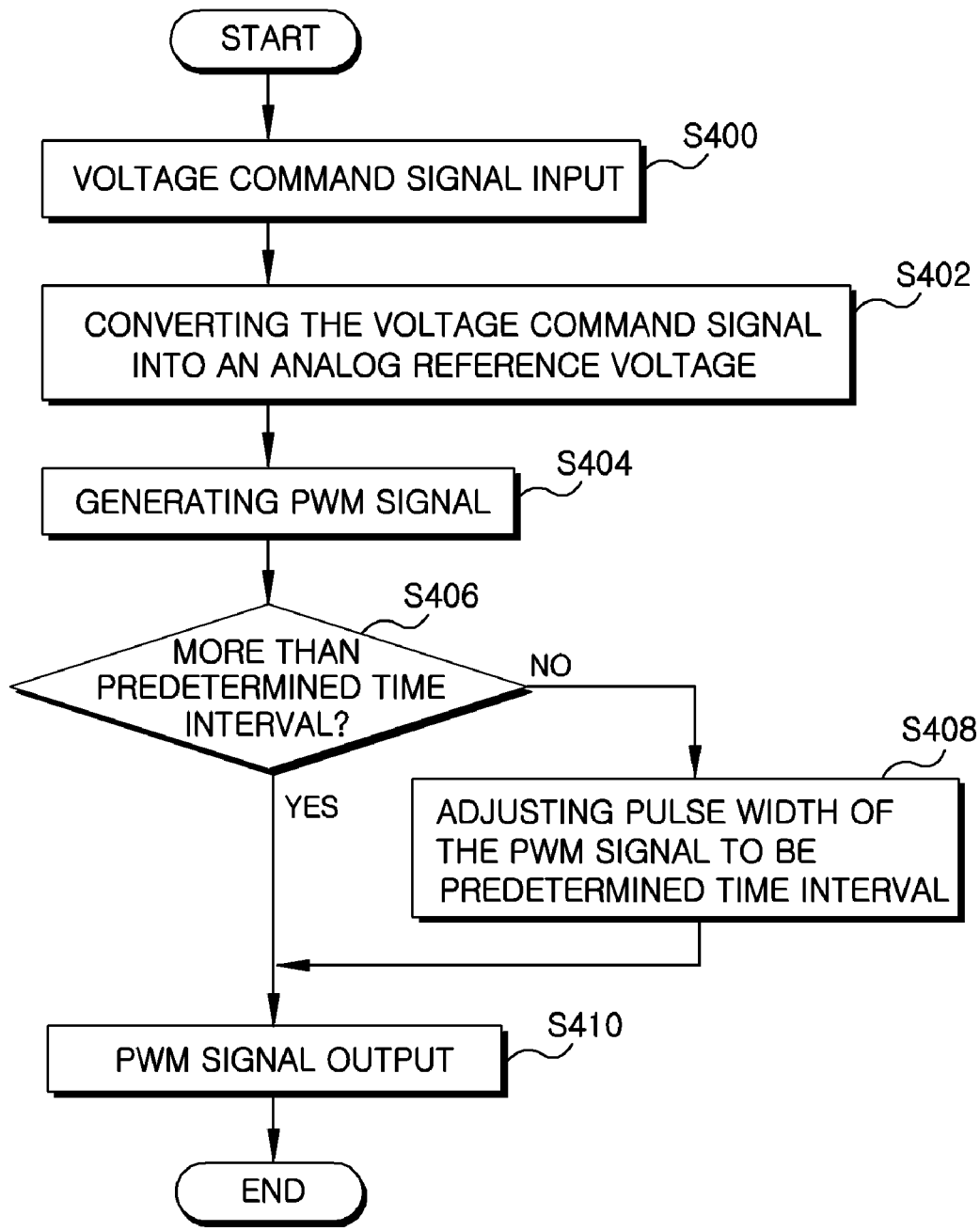
FIG. 4 is a signal flowchart showing the operation of a preferred embodiment of a unitary control unit according to an overvoltage protection method of the present invention.

FIG. 4 is a signal flowchart showing the operation of a preferred embodiment of a unitary control unit according to an overvoltage protection method of the present invention.

Referring to FIG. 4, a main control unit 110 inputs a voltage command signal to each of a plurality of unitary control units 200-1, 200-2, . . . , 200-N (S400), and an analog reference voltage generation part 310 converts the voltage command signal into an analog reference voltage (S402).

And, each of the plurality of unitary control units 200-1, 200-2, . . . , 200-N compares the voltage levels of the converted analog reference voltage and a sawtooth wave generated by a sawtooth wave generation unit 300 to generate a PWM signal (S404), and determines if the pulse width of the generated PWM signal is more than a predetermined time interval (S406).

As a determination result, in a case the pulse width of the generated PWM signal is more than a predetermined time interval, each of the plurality of unitary control units 200-1, 200-2, . . . , 200-N outputs the generated PWM signal as it is (S410).

And as a determination result, in a case the pulse width of the generated PWM signal is not more than a predetermined time interval, each of the plurality of unitary control units 200-1, 200-2, . . . , 200-N adjusts the pulse width of the generated PWM signal to be a predetermined time interval (S408), and outputs the pulse width adjusted PWM signal (S410).

While the present invention has been described in detail through representative embodiments in the above part, those skilled in the art would understand that various modifications can be made in the described embodiment without departing from the scope of the present invention.

Therefore, the scope of the present invention rights should not be restricted to the described embodiment, but should be defined by the accompanying claims and its equivalents.

What is claimed is:

1. An overvoltage protection apparatus of a high voltage apparatus, the overvoltage protection apparatus comprising:
   a sawtooth wave generation unit configured for generating a sawtooth wave having a predetermined frequency and a voltage level;
   an analog reference voltage generation unit configured for converting a voltage command signal input from a main control unit into an analog reference voltage;
   a comparison unit configured for comparing voltage levels of the generated sawtooth wave and the analog reference voltage and generating a Pulse Width Modulation (PWM) signal;
   a pulse width determination unit configured for determining a pulse width of the generated PWM signal; and
   a PWM signal output unit configured for outputting the generated PWM signal without changing the determined pulse width or adjusting the determined pulse width at a predetermined time interval according to a determination of the pulse width determination unit and outputting the generated PWM signal with the adjusted pulse width.

2. The overvoltage protection apparatus of claim 1, wherein:
   outputting the generated PWM signal without changing the determined pulse width occurs when the determined pulse width of the generated PWM signal is greater than the predetermined time interval; and
   adjusting the determined pulse width at the predetermined time interval and outputting the adjusted PWM signal occurs when the determined pulse width is less than the predetermined time interval.

3. An overvoltage protection method for a high voltage inverter, the method comprising:

converting, by a main control unit, a voltage command signal provided as a digital signal into an analog reference signal;

generating a Pulse Width Modulation (PWM) signal by comparing the analog reference signal with a sawtooth wave having a predetermined voltage level and frequency;

determining a pulse width of the generated PWM signal; and outputting the generated PWM signal without changing the determined pulse width or outputting the generated PWM signal having a pulse width that is adjusted at a predetermined time interval.

4. The method of claim 3, further comprising:

adjusting the determined pulse width to equal the predetermined time interval and outputting the generated PWM signal having the adjusted pulse width when the determined pulse width is less than the predetermined time interval.

5. The method of claim 3, further comprising:

outputting the generated PWM signal without changing the determined pulse width when the determined pulse width is greater than the predetermined time interval.

* * * * *